May 30, 1933. A. E. AXLUND 1,911,485
PIPE SUPPORT
Filed June 14, 1932
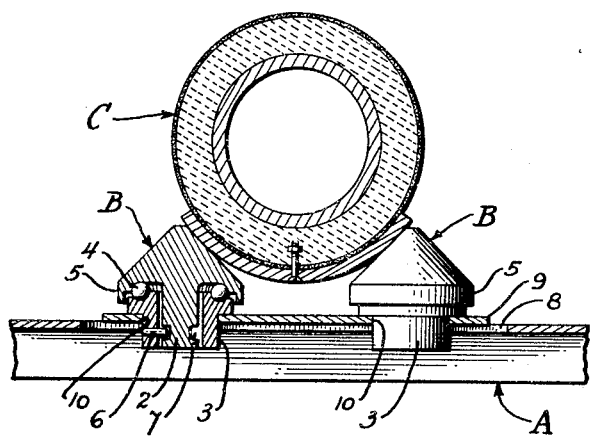
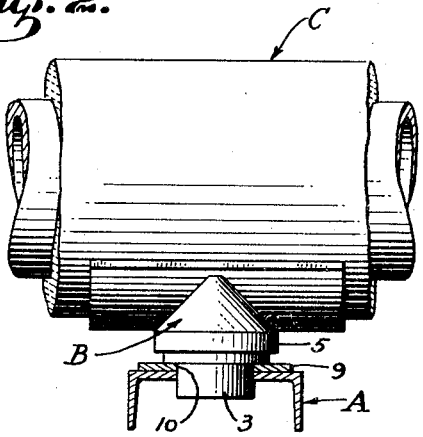
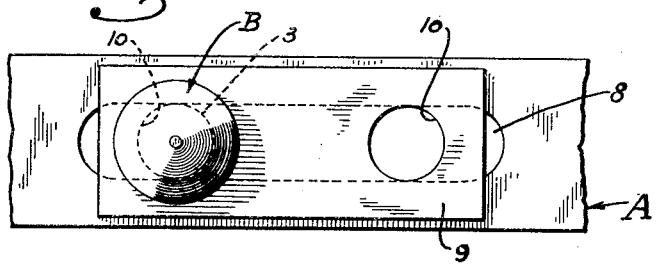
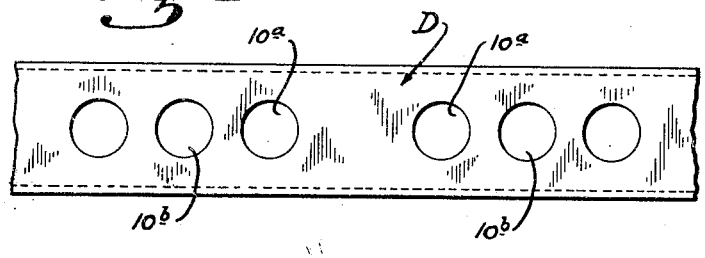
INVENTOR.
A. E. Axlund.
BY
Townsend and Loftus.
ATTORNEYS.

Patented May 30, 1933

1,911,485

UNITED STATES PATENT OFFICE

ANDREW E. AXLUND, OF VALLEJO, CALIFORNIA, ASSIGNOR TO JONES BROS. ASBESTOS CO., OF SAN FRANCISCO, CALIFORNIA, A CORPORATION OF CALIFORNIA

PIPE SUPPORT

Application filed June 14, 1932. Serial No. 617,085.

This invention relates to pipe supports of the class commonly employed for suspending or supporting steam pipes in buildings, underground conduits, or similar installations. Pipes, carrying steam or other heated fluids, contract and expand as the temperature of the fluid varies and as such are subject to longitudinal movement with relation to the pipe hangers or other supports provided. Pipes of this character are often provided with bends or right angular fittings, such as elbows or the like, and as such are not only subject to longitudinal movement but also to lateral movement. Hence, if a pipe is to be properly supported, particularly where it is covered with a heat insulating material, a hanger or support must be provided which will allow both longitudinal and lateral movement as the insulating covering is otherwise very apt to become damaged.

The object of the present invention is to generally improve and simplify the construction and operation of pipe supports; to provide a support which will allow both longitudinal and lateral movement of a pipe; to provide a support which is readily adjustable to accommodate pipes of varying diameter; and further, to provide a support that is cheap, but substantial in construction, and in which the parts may be standardized and few parts required.

The pipe support is shown by way of illustration in the accompanying drawing, in which—

Fig. 1 is a central longitudinal section of the pipe support showing one of the supporting members in side elevation.

Fig. 2 is an end view of the pipe support partially in section.

Fig. 3 is a plan view of the pipe support showing one of the supporting members removed.

Fig. 4 is a plan view of a modified form of supporting bar.

Referring to the drawing in detail, A indicates a supporting bar constructed of channel iron or the like. This bar is supported in any suitable manner, for instance, on a pedestal in an underground conduit, or by a bracket or hanger, if installed in a building or the like. Pedestals, brackets, and hangers of different types may be employed and illustration thereof is, accordingly, thought unnecessary.

The supporting bar A forms a support for a pair of vertically disposed cone-shaped rollers generally indicated at B, and these in turn form a support for a heated fluid conducting pipe, such as indicated at C. The cones form an anti-friction support for the pipe which permits a free longitudinal movement of the same during expansion and contraction. Each cone is provided with a vertically disposed pin or shaft extension 2 which is guided or journaled in a bearing sleeve 3. A race-way for the reception of ball bearings 4 is formed between the upper end of the bearing sleeve and the base of the cone so as to reduce friction to a minimum and an annular downturned flange 5 on the cone forms a guard to exclude dirt and other foreign matter. The cone, together with the bearing sleeve and the interposed ball bearing, is secured against separation, when assembled, by a screw or pin, such as indicated at 6, said pin projecting into an annular groove 7 in the lower end of the shaft so as to permit free rotation of the shaft and cone.

It was previously stated that a pipe support of the character described should not only permit free longitudinal movement of the pipe with relation to the support, but also lateral movement with relation thereto. In the present instance, lateral movement of the cone-shaped rollers B is accomplished as follows: By referring to Figs. 1 and 3, it will be noted that the supporting bar A is longitudinally slotted, as indicated at 8, and that the supporting bar forms a support for a plate 9. This plate has openings 10 formed in opposite ends thereof, said openings having a diameter equal to the width of the slot 8. The bearing sleeve ends 3 of the cone-shaped rollers are insertable in the openings 10 and project not only through the plate 9 but also through the slotted portion 8 of the supporting bar.

The plate 9 performs two main functions:

First, that of a spacer plate which determines the spacing between the cones; and secondly, that of a floating support which permits the cones, together with the pipe C supported thereby, to move laterally of the direction of the pipe or longitudinally of the supporting bar A. Hence, if there is any lateral movement of the pipe line C with relation to its longitudinal axis, such movement is permitted as the plate 9 which carries the cone-shaped rollers B and the pipe is permitted to move freely in the slot 8 from end to end thereof. The plate 9 has another important function as it provides an adjustable means whereby the spacing between the cone-shaped rollers B may be increased or decreased to suit pipes of varying diameter. For instance, if a pipe of the diameter shown at C is employed, the spacing between the cone-shaped rollers will be such as shown in Figs. 1 and 2. If a larger pipe is employed, a plate 9 having a greater spacing between the holes 10 may be employed. In other words a number of plates, such as shown at 9, may be employed with different spacings between the holes 10 so as to permit any spacing desired between the cone-shaped rollers.

There are some instances in which lateral movement of the pipe line is entirely absent and, in such instances, floating or lateral movement of the cone-shaped rollers is not required. Supporting bars, such as shown at D in Fig. 4, may then be employed; that is, the main web of the channel bar is merely provided with perforations or holes, such as shown at 10a. If a comparatively small pipe is to be supported by the cone-shaped rollers, the bearing sleeves 3 are inserted in the first set of holes, as shown at 10a. If a larger pipe is to be supported, the cone-shaped rollers may be inserted in the holes indicated at 10b, hence a quick and ready adjustment is obtainable where pipes of varying diameter are to be supported and it is accomplished without increasing or decreasing the size of the rollers, or any other parts employed, and where a floating lateral movable support is required, it is only necessary to provide plates, such as shown at 9, of varying length.

The vertical disposition of the cone-shaped rollers B is important as it eliminates the necessity of providing any means for securing the cone-shaped rollers with relation to the supporting bar; that is, the cone-shaped rollers are merely inserted in the sockets or holes provided therefor and they will be there retained by the weight of the pipe. Furthermore, by vertically disposing the cone-shaped rollers two inclined surfaces are provided for the supported pipe. The contact area between the pipe and the rollers becomes a mere line contact, friction and binding action is reduced, hence eliminating any tendency for the pipe to climb the rollers or to damage the insulating material employed.

The general structure employed is exceedingly simple. The cone-shaped rollers, together with the bearing sleeves, are assembled as a unit by inserting the pins 6 and they thus form standardized units which are placed in position by merely inserting the bearing sleeves in the holes provided for their reception. These holes may be closely spaced or separated as far as desired and pipes of varying diameter will thus be taken care of without increasing the size of the cone-shaped rollers or the supporting parts. Few parts are employed, to-wit, the supporting bar A, and a pair of cone-shaped rollers, these being the only parts required where lateral movement of the pipe line is not encountered. But where floating or lateral movement must be taken care of the only additional member employed will be the plate 9. The parts are simple, substantial in construction, cheap to manufacture. They are quickly assembled and time and labor of installation is reduced to a minimum. The pipe line itself is, furthermore, free to move in all directions and it may be readily removed from the cone-shaped supporting members as overhead obstructions may be entirely eliminated.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. A pipe support comprising a supporting bar, and a pair of interspaced vertically disposed cone-shaped rollers journaled on the bar and forming a pair of opposed inclined surfaces for the support of a pipe.

2. A pipe support comprising a supporting bar, a pair of interspaced vertically disposed cone-shaped rollers journaled on the bar and forming a pair of opposed inclined surfaces for the support of a pipe, and means for varying the spaces between said cone-shaped rollers to accommodate pipes of varying diameter.

3. A pipe support comprising a supporting bar, a pair of interspaced vertically disposed cone-shaped rollers journaled on the bar and forming a pair of opposed inclined surfaces for the support of a pipe, and means permitting longitudinal movement of the rollers in the supporting bar.

4. A pipe support comprising a supporting bar, a plate longitudinally movable on said bar, and a pair of interspaced vertically disposed cone-shaped rollers carried by the plate and forming a pair of opposed inclined surfaces for the support of a pipe.

5. A pipe support comprising a supporting bar, said bar having an elongated slot formed therein and extending longitudinally of the bar, a plate longitudinally movable on said bar, said plate having a hole formed adjacent each end thereof in alignment with a slot, a bearing sleeve insertable in each hole and extending through the holes in the plate and the slot in the bar, and a vertically disposed cone-shaped roller journaled in each bearing sleeve, said rollers forming a pair of opposed inclined surfaces for the support of a pipe.

ANDREW E. AXLUND.